United States Patent [19]
Hatsugai et al.

[11] 3,792,405
[45] Feb. 12, 1974

[54] WIPER INTERMITTENTLY OPERATING DEVICE

[75] Inventors: Akitomi Hatsugai; Kazuyuki Ishida, both of Kiryu, Japan

[73] Assignee: Mitsubadenkiseisakusho Co., Ltd., Gunma-Prefecture, Japan

[22] Filed: Oct. 18, 1971

[21] Appl. No.: 189,938

[30] Foreign Application Priority Data
Dec. 18, 1970 Japan.............................. 45/126473

[52] U.S. Cl. .......................... 337/140, 318/DIG. 5
[51] Int. Cl. ............................................ H01h 61/06
[58] Field of Search ............ 318/DIG. 2; 337/135, 337/138, 140, 81, 92, 98, 88, 103, 141

[56] References Cited
UNITED STATES PATENTS
| | | | |
|---|---|---|---|
| 2,024,385 | 12/1935 | Persons............................ | 337/103 X |
| 2,905,790 | 9/1959 | Markham............................ | 337/103 |
| 3,174,015 | 3/1965 | Almassy............................ | 337/141 X |
| 3,291,936 | 12/1966 | Merkl................................. | 337/81 X |
| 2,828,460 | 3/1958 | Contant et al.................. | 318/DIG. 2 |
| 3,091,128 | 5/1963 | Rees et al. ...................... | 318/DIG. 2 |

FOREIGN PATENTS OR APPLICATIONS
805,619   11/1936   France................................ 337/138

*Primary Examiner*—Bernard A. Gilheany
*Assistant Examiner*—F. E. Bell
*Attorney, Agent, or Firm*—Fidelman, Wolffe, Leitner & Hiney

[57] ABSTRACT

An intermittently operating wiper device wherein periodically and intermittently wiping operation is produced by adding a circuit containing: a) a lagging relay which is provided in a wiping mechanism intermittently activated by being heated and cooled by the intermission of an adjustable heating current, and b) an intermittently wiping switch having ON, OFF contacts or ON contact, to a circuit having a wiper motor connected to the well-known wiper switch, and an auto-stop relay controlled by said wiper motor. The invention also includes improvements in the lagging relay used in said intermittently operating device.

6 Claims, 9 Drawing Figures

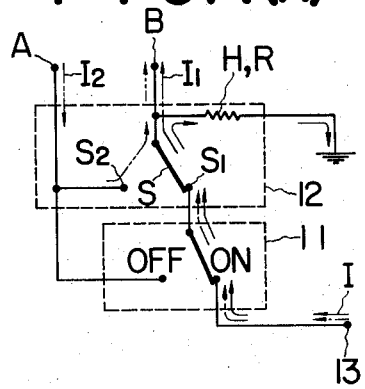
FIG. I(A)
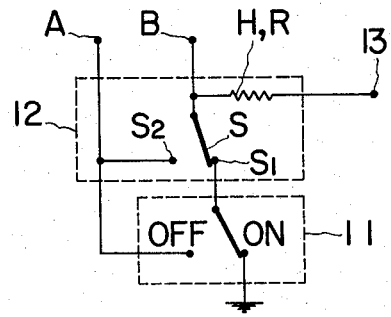
FIG. I(B)
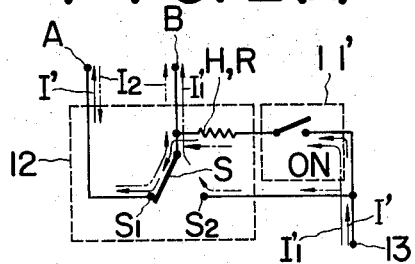
FIG. 2(A)
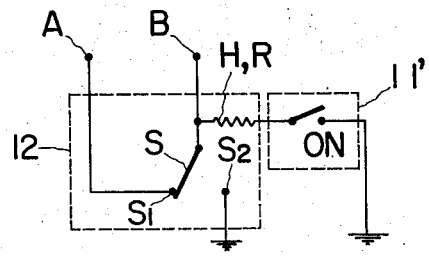
FIG. 2(B)
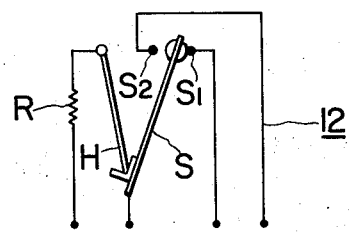
FIG. 3

WIPER INTERMITTENTLY OPERATING DEVICE

SUMMARY OF THE INVENTION

This invention relates generally to an intermittently operating wiper device for vehicles such as automobiles and the like used in cases where continuous wiping is unnecessary as in drizzling rains or mists, and more specifically to a wiper intermittently operating device using a lagging relay which operates periodically and after wiping a predetermined number of times, stops the wiper automatically at a predetermined position.

With the known wiper device particularly in the case where continuous wiping of wiper is unnecessary as in drizzling rains or mists, the driver has repeated such operations as turning on the wiper switch at a desired time to operate the wiper, after wiping once or twice with the wiper, turning off the wiper switch thereby to stop the wiper. Accordingly, the known device has involved a drawback that in drizzling rains the operational frequency of wiper is too fast and requires continuous manual operation by the driver, thus causing an extremely dangerous driving condition.

It is, therefore, a first object of the present invention to provide an intermittently operating wiper device which eliminates the described drawback, the operation is so precise that it is periodically operated by only turning the intermittently wiping switch on once, and it repeats periodical operation while said switch is on, and it is also inexpensive in costs.

A second object of the present invention is to provide an intermittently operating wiper device which can be easily attached to existing wiper mechanism.

Other objects and characteristics of the present invention will be apparent from a few examples embodying the present invention illustrated hereinbelow with reference to the accompanying drawings.

BRIEF DESCRIPTION OF THE DRAWING:

FIG. 1 are circuit diagrams respectively showing the first embodiment of the present invention; (A) shows the device to be used in the wiper mechanism circuit of (+) switch system, and (B) that of (−) switch system;

FIG. 2 are circuit diagrams respectively of the essential part showing the second embodiment of the present invention, and (A) shows the device to be used in wiper mechanism circuit of (+) switch system, and (B) that of (−) switch system;

FIG. 3 is a circuit diagram showing the first embodiment of the intermittently operating a lagging relay forming the essential part of the present invention;

Figure 4:
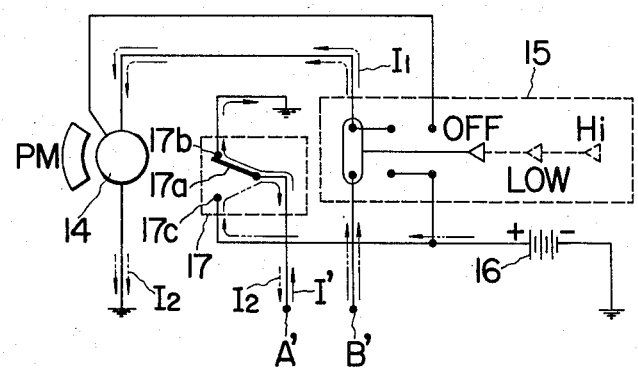
FIG. 4 is a circuit diagram showing (+) switch system of the conventional wiper mechanism to be attached to the essential part device of the present invention.
Figure 5:
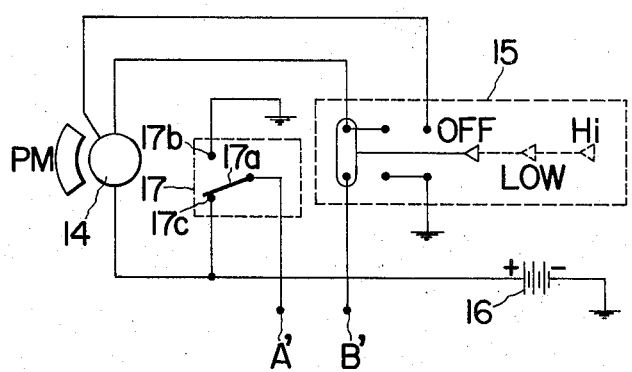
FIG. 5 is a circuit diagram showing (−) switch system of the same.

DETAILED DESCRIPTION OF THE INVENTION:

FIGS. 1A & 1B show the first embodiment of the present invention, to be newly attached to the heretofore known wiper mechanism circuit of (+) switch system of FIG. 4 and to the heretofore known wiper mechanism circuit of (−) switch system of FIG. 5, respectively. These additional devices are respectively composed of an intermittently wiping switch 11 having ON and OFF contacts and a lagging relay 12. With respect to the lagging relay 12 detailed explanation will be made hereinbelow in FIGS. 3, 6 and 7. The device shown in the first embodiment of the present invention has a circuit system where the wiper operates when the intermittently wiping switch 11 is turned on, simultaneously.

FIGS. 2 (A) and (B) are circuit diagrams respectively showing the second embodiment of the additional device to be newly attached to the wiper mechanism circuits of the conventional (+) switch system and (−) switch system shown of FIG. 4 and FIG. 5 respectively, and both devices are constituted by an intermittently wiping switch 11' having ON and OFF contacts and a lagging relay 12. This is based on a circuit system where the wiper does not operate until the lagging relay 12 operates which is a predetermined period after the intermittently operating switch 11' is turned on, Then, FIG. 3 shows the first embodiment of the lagging relay 12 used in the present invention. A spring S made of a thin metal plate having elasticity and capable of distortion, and heating wire H (or a heating band) or the like are fitted in a tensed state such that the tip of spring S comes into contact with a contact S1. When the heating wire H is heated for a given amount of time and elongates by expansion, the spring S reverse by distortion and separate from the contact S1 and comes into contact with S2. When the heating wire H, the spring S reverses again and returns to the original position. The expansion and contraction of the heating wire H is by the intermission of current to when S moves from contacts S1 to S2. The time it takes to move S from S1 to S2 by heating and back again by cooling (lagging degree) are determined by adjusting the current flowing to the heating wire H by the resistance R or the like. Further, in the drawing reference numeral 13 designates a source connecting terminal connected to the source.

FIGS. 4 and 5 are circuit diagrams of wiper mechanisms of (+) and, (−) switch systems, respectively, said mechanisms are respectively connected to connecting terminals A, B of the additional circuit shown in FIGS. 1 and 2 through connecting terminals A', B'. In the drawings, reference numeral 14 designates a wiper motor capable of rotating at high or low speeds; 15, a wiper switch capable of selecting turning OFF, Low and Hi rotations of said wiper motor 14; 16, a source; 17, an auto-stop relay which interlocks with the wiper motor 14, and when the wiper brush (not shown) has reached a predetermined position of front glass, the movable member 17a comes into contact with a contact 17b. Accordingly, when wiping is not conducted by the wiper, the movable member 17a comes into contact with 17b, and when wiping is conducted, it comes into contact with a contact 17c.

The operations of the device according to the present invention, having the above described structure will be explained hereinbelow with respect to the case of connecting the additional device of the first example shown in FIG. 1 (A) and FIG. 2 (A) to the wiper mechanism circuit of (+) switch system shown in FIG. 2 (A) through connecting terminals A, B and . However, the explanation on (−) switch system involving FIG. 1B, 2B and 5 will be omitted.

I. In the case where the continuous wiping of wiper is unnecessary as in drizzling rains and the like, intermittently operating switches 11, 11' are turned on while the wiper switch 15 is off. However, at the time continuous wiping is necessary, the method as heretofore may be used.

1. Upon this occasion, in the additional device of the embodiment shown in FIG. 1 (A) the current I shown by solid line flows from the source terminal 13 and begins to heat the heating wire H. Simultaneously, a current I' shown by line with one-consecutive-dot in FIG. 1 (A) and FIG. 4 flows to actuate the wiper motor 14 via S, S1, A, A', 17a, 17b and ground.

2. In the additional device of the embodiment shown in FIG. 2 (A) the current I' shown by solid line flows from the source terminal 13 and begins to heat the heating wire H via S, S1, A, A', 17a, 17b and ground. However, upon this occasion, the current I'1 shown by line with one-consecutive-dot flows from the source terminal 13, an the wiper motor 14 does not operate because the resistance of the circuit from ground wiper → motor 14 → OFF contact of wiper switch 15 → contact terminals B', is larger than the circuit from lagging relay contact S1 → connecting terminals A, A' → auto-stop relay movable member 17a → contact 17c → ground.

II. When the heating wire H is heated with currents I, I' and expanded, spring S reverses separates from contact S1 and comes into contact with contact S2. Accordingly, 1. In the additional device of FIG. 1(A), the current I is cut off. While H was heating up, motor 14 moved the wiper and consequently the movable member 17a into contact with the contact 17c. A current 12 shown by chain line with two consecutive dots flows from a source 16, via 17c, 17a, A', A, S2, S, B, B' and 15 "off" to the motor 14 which continues to operate. When wiper brush has reached a predetermined position, the movable member 17a of interlocking auto-stop relay 17 comes into contact with a contact interrupting the current path for 12, whereupon electromagnetic braking is applied and the motor comes to a stop.

2. In the additional device of FIG. 2(A), the current I' is cut off, and the current I' flows through contact S2, spring S, connecting terminal B, B', switch 15 "off" to actuate wiper motor 14.

III. When the heating wire heating currents I, I' are cut off, the heating wire H is cooled by ambient air and contracted, after lapse of short time the spring S reverse again, separates from contact S2 and comes into contact with contact S1. Accordingly, 1. In the additional device of FIG. 1(A) assumes the state of I (1) and begins to heat the heating wire H.

2. In the additional device of FIG. 2(A), the current I1 is cut off but the movable member 17a of auto-stop relay 17 comes into contact with the contact 17c simultaneously with the actuation of motor 14. Therefore, a wiper motor operating current 12 flows, from source 16 via 17c, 17a, A', A, S1, B, B', 15 "off" to wiper motor 14 which continues to operate. When the movable member 17a of auto-stop relay 17 has come to the contact 17b, the electromagnetic braking is applied and the motor stops its operation. Here the additional device returns back to the state of I (2), and begins to heat the heating wire H.

The operations of I to III are repeated while the intermittently operating switches 11, 11' are in the "on" position thereby to operate the wiper periodically.

As has been explained in the foregoing, the effects of the present invention are given as follows:

1. Because of the combination of lagging relay and switch it is cheaper than when the motor is used.
2. It can be easily fitted in the already existing car.
3. Even in drizzling rains or the like, it is enough only to operate once the intermittently wiping switch, and therefore it is safe in driving vehicles.

Figure 6:
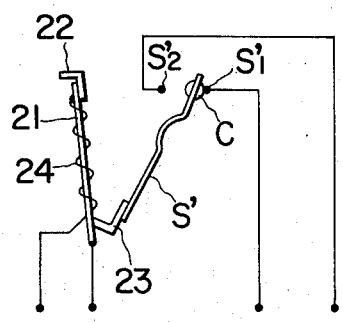
FIG. 6 is a circuit showing the second embodiment of the intermittently operating a lagging relay forming the essential part of the present invention.
Figure 7:
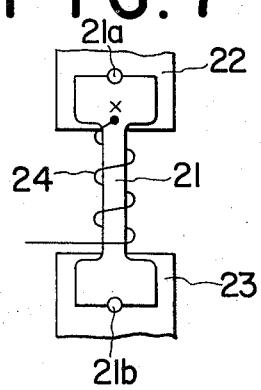
FIG. 7 is an enlarged front elevation showing the essential part of the relay shown in FIG. 6.

Then, the second embodiment of intermittently lagging relay which forms the essential part of the present invention will be explained with reference to FIG. 6 and 7. The intermittently lagging relay of the first embodiment explained with respect to FIG. 3 has the following disadvantages in the case where it is used for small number of wiping, for example, from 1 to 4 times in a minute:

1. It is necessary to strengthen the tension of heating wire H and increase clearance S1 – S2 between contacts and prolong the time until reversion, and therefore a large force is applied to the heating wire H, and the heating wire H discontinues or the heating wire H is elongated as it is, and is inoperated. That is, durability is deteriorated.

2. It is necessary to reduce the current flowing to the heating wire H and prolong the time until the elongation of heating wire H, and upon this occasion, it is liable to produce insufficiency in the elongation of the heating wire H, and invite winkering unstability and functional deterioration.

The lagging relay of the second embodiment of embodying the present invention is intended to eliminate the aforementioned drawback. In FIGS. 6 and 7, reference numeral 21 designates a heat expansion element such as a bimetal or a heating band or the like, bosses 21a, 21b at both ends of said member being hooked with upper and lower hooking member 22, 23; 24, a heating wire which insulated and wound around said heat expansion element 21; S', a movable spring one end of which is supported by a lower part hooking member 23 and another end of which has a movable contact C, and said spring S' alternating between contacts S'1 and S'2.

The lagging relay of the second embodiment having the aformentioned structure is different from the first example in that a current directly flows through the extending heating wire H, and said heating wire H itself does not extend by the generated heat due to said resistance. More specifically, heating wire 24 wound around the periphery of heat expansion element 21 indirectly heats said heat expansion element 21 and causes it to elongate to reverse the movable spring S' and switches from contacts S1' to S2'.

The extension of heat expansion element 21 is determined depending upon the current flowing in the heating wire 24 (since bimetal member or heating band is large in sectional area as compared with the heating wire 24, heating is determined by the current flowing in the heating wire 24) and accordingly, the current is independently selected and the operation time can be selected by the width of heat expansion element 21 particularly in a low range.

The device of the second embodiment explained in the foregoing has the following large effects as a lagging relay for operating the wiper intermittently.

1. Since a bimetal member or a heating band is used as a heat expansion element, the strength is sufficient and durability is elevated.
2. Since it is a side heating type, the current necessary for heating can be sufficiently supplied.

The present invention has been explained with reference to a few examples. It will be understood, however, that other examples may be possible and a number of modifications in dimensional ratio and arrangement of each part may be possible without departing from the spirit of the present invention as shown in the following claims.

We claim:

1. An intermittently operating wiper device for use in combination with a wiper system having a power source, a wiper motor connected to a first side of said power source; a wiper on-off switch having a first off contact connected in series with said motor; and an auto-stop switch means having a first contact connected to said sources first side, a second contact connected to a second side of said source, and a first member having a first end movable between said first and second contacts in response to the movement of a wiper, said device comprising:

an intermittently wiping switch having an "on" contact connected to said second side of said source, an "off" contact connected to a first terminal, and a second member having a first end movable between said "on" and "off" contacts;

a lagging relay having a first contact connected to a second end of said second movable member, a second contact connected to said first terminal and "off" contact, a third movable member having a first end connected to a second terminal and having a second end movable between lagging relay's first and second contacts, and a heating wire and a resistance in series connected between said third movable member's first end and said first side of said source;

said first terminal being connected to a second end of said first movable member and said second terminal being connected to a second off contact of said wiper on-off switch;

said third member moves in response to activation-deactivation of said heating wire to cause intermittent operation of said wiper motor.

2. An intermittently operating wiper device for use in combination with a wiper system having a power source, a wiper motor connected to a first side of said power source; a wiper on-off switch having a first off contact connected in series with said motor; and an auto-stop switch means having a first contact connected to said sources first side, a second contact connected to a second side of said source, and a first member having a first end movable between said first and second contacts in response to the movement of a wiper, said device comprising:

an intermittently wiping switch having one side connected to said second side of said source;

a lagging relay having a first contact connected to said source's second side, a second contact connected to a first terminal, a second member having a first end connected to a second terminal and a second end movable between said lagging relay's first and second contacts, a heating wire and resistance in series connected between said second movable member's first end and the other side of said intermittent switch;

said first terminal being connected to a second end of said first movable member and said second terminal being connected to a second off contact of said wiper on-off switch;

said second member moves in response to activation-deactivation of said heating wire to cause intermittent operation of said wiper motor.

3. An intermittently operating wiper device comprising:

a power source;
wiper motor connected to a first side of said power source;
wiper on-off switch having an input terminal of the "off" position connected to said wiper motor;
heating element connected between an output terminal of said wiper switch "off" position and said sources first side;
thermal switch means responsive to said heating element having input terminal connected to said output terminal of said wiper switch "off" position, and first and second output terminals;
intermittent on-off switch connected between said thermal switch means' first output terminal and a second side of said power source; and
auto-stop switch means reponsive to the position of said wiper having input terminal connected to said thermal switch means' second output terminal, first output terminal connected to said source's first side, and second output terminal connected to said source's second side;
said heating element and said thermal switch means determine the period of intermittence.

4. A device as in claim 3 including a variable resistor means in series with said heating element for varying said intermittent period.

5. An intermittently operating wiper device comprising:

a power source;
wiper motor connected to a first side of said power source;
wiper on-off switch having an input terminal of the "off" position connected to said wiper motor;
intermittent on-off switch having an input terminal connected to second side of said power source and an output terminal;
heating element connected between an output terminal of said wiper switch "off" position and said intermittent switch output terminal;
thermal switch means responsive to said heating element having input terminal connected to said output terminal of said wiper switch "off" position, and first and second output terminals; and
auto-stop switch means responsive to the position of said wiper having input terminal connected to said thermal switch means' second output terminal, first output terminal connected to said source's first side, and second output terminal connected to said source's second side, said heating element and said thermal switch means determine period of intermittence.

6. A device as in claim 5 including a variable resistor means in series with said heating element for varying said intermittent period.

* * * * *